Oct. 19, 1937. A. PETERSEN 2,096,592
BRAIDING MECHANISM
Filed June 20, 1936 8 Sheets-Sheet 3

Fig.3

Inventor
Anker Petersen
by Roberts Cushman Woodberry
Att'ys.

Oct. 19, 1937.  A. PETERSEN  2,096,592
BRAIDING MECHANISM
Filed June 20, 1936  8 Sheets-Sheet 5

Inventor
Anker Petersen
By Roberts Cushman & Woodbury
Att'ys

Oct. 19, 1937.  A. PETERSEN  2,096,592
BRAIDING MECHANISM
Filed June 20, 1936  8 Sheets-Sheet 7

Inventor
Anker Petersen
by Roberts Cushman Woodbury
Att'ys.

Inventor
Anker Petersen
by Roberts Cushman & Woodberry
att'ys.

Patented Oct. 19, 1937

2,096,592

UNITED STATES PATENT OFFICE 2,096,592

BRAIDING MECHANISM

Anker Petersen, Boston, Mass., assignor to James Joseph Lannon, West Newton, Mass.

Application June 20, 1936, Serial No. 86,285

24 Claims. (Cl. 96—3)

This invention pertains to braiding machines and relates more particularly to machines for the production of braid in which the individual constituent yarns extend each in a zigzag path longitudinally of the braid, as distinguished from the more common types of braid in which the yarns extend about the axis of the braid in continuous helices,—the invention further pertaining to an improved braid forming the product of the improved machine.

Most braiding machines are of one or the other of two well recognized classes, first, those of the so-called "Maypole" type, in which two sets of yarn carriers move in opposite directions in sinuous intersecting paths; and second, those in which the yarn carriers of the two sets are mounted respectively upon concentric annular supports, one of which, at least, revolves, so that the two forms of carriers have a relative movement in opposite directions in concentric circles. The product of the machines of both of these common types is a tubular or flat tape-like braid made up of two sets of yarns which individually extend in generally helical paths longitudinally of the braid, the helices of one set being of opposite pitch from those of the other set.

In the third and much less common class of braiding machine, to which the present invention pertains, each individual yarn carrier revolves in its own orbit about a fixed point in space (instead of traveling bodily about the axis of the forming braid as is the case in machines of the other two more common types), but in such a manner that each such individual carrier orbit intersects the orbit of an adjacent carrier or carriers, the result being that each individual yarn extends in a zigzag rather than in a helical path.

The zigzag type of braid resulting from the operation of machines of this third class possesses advantages over the usual helical type of braid for some purposes at least. For example, it is possible to ornament such a zigzag braid with continuous substantially straight longitudinal stripes of contrasting color or material; the resultant braid tends to have a longitudinally ribbed effect of an ornamental character quite distinct from that of the usual helical braid; the zigzag braid, in relatively large diameters, may constitute an outer covering or container for core material of any desired character and the core material may readily be released from such covering or container merely by breaking a single yarn of the braided cover, such breakage resulting in immediate splitting and opening out of the tubular structure so as to release the core material; and such zigzag braid usually shows far less tendency to stretch or collapse diametrically when subjected to longitudinal tension than does the usual helical braid, thus making it useful for purposes for which twisted strands are customarily employed but without the disadvantage of unbalanced twist which is common to twisted cords.

While I am aware that machines for making braid of the zigzag type have heretofore been devised, such machines, so far as is known to me, have not been commercially satisfactory. One primary cause of the failure of prior machines to give satisfactory results is, I believe, the great variation in tension to which the individual yarns are subjected as the carriers revolve in their individual orbits,—the distance from a carrier to the braiding point varying to a very marked degree as the carrier revolves. This makes proper tensioning almost impossible and results in frequent breakage of yarn and an uneven braid. Further, by reason of the variable tension, such machines must be driven at relatively low speeds, with resultant high cost of production while, in most instances, such machines are so designed as to require many specially constructed and expensive parts and are difficult to keep in proper operative condition.

Among the objects of the present invention is to provide a braiding machine for making braid of the zigzag type and capable of running at very high speeds without developing excessive vibration, noise or wear, and which does not require an excessive amount of power for driving it; to provide a machine of such design that the distance between the braiding point and each individual carrier, as the latter revolves in its orbit, does not vary materially, thereby minimizing difficulties in maintaining uniform tension on the yarn; to provide a machine which, to a large extent, may be built from standard commercial parts, thus reducing construction costs; to provide a machine so devised as to permit the introduction of core material either as a continuous strand or in separate lengths and of substantially any desired diameter so as to be covered by the forming braid; to provide a machine equipped to impart any desired twist to a core strand or strands, thereby to neutralize any tendency of the braid proper to twist; to provide for the forming of a multi-strand core for direct delivery to the braiding point and from material difficult to handle; to provide a machine operative to deliver warp strands for striping purposes or to increase the bulk of the braid material or to prevent stretch of the latter or to impart elasticity as the case may be, but which do not form essential elements of the braid proper; to provide means for twisting a plurality of independent strands either about each other or about a core strand to form each of such warp yarns; as well as to provide a novel braid of zigzag type of a distinct external appearance and/or containing core material in continuous or discontinuous lengths, and/or elastic or substantially inelastic as may be preferred.

Other objects and advantages of the present invention will be made manifest in the following more detailed description and by reference to the accompanying drawings, in which

Fig. 16$^a$ is a view similar to Fig. 16, but to larger scale, illustrating single fabric which includes warp strands;

Figures 4, 7, 8, 9:
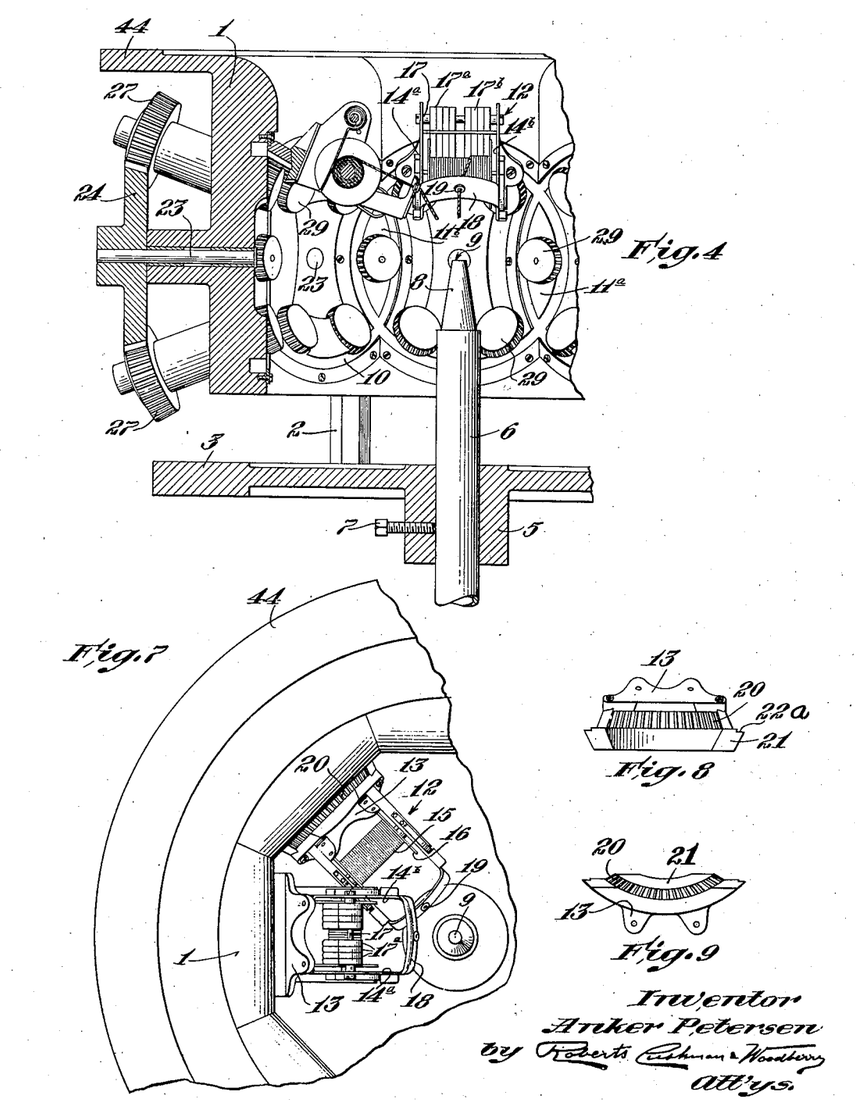
Fig. 4 is a fragmentary section substantially on the line 4—4 of Fig. 2.
Fig. 7 is a fragmentary plan view showing the relative positions of the adjacent carriers at one point in the cycle of operations.
Fig. 8 is an elevation of the base portion of a braiding carrier with its gear and guide shoe.
Fig. 9 is a plan view of the parts shown in Fig. 8.

Referring to the drawings, the improved machine is illustrated as comprising an annular, preferably substantially cylindrical support 1, conveniently formed as an integral casting, although it is contemplated that it may be made of several independent parts properly secured in assembled relation. This support 1 rests upon posts 2 which are secured to an annular plate or spider 3 supported by legs 4. The plate 3 preferably is provided with a central hub 5 (Fig. 4) having a vertical bore for the reception of a tubular die support and braid guide 6 which may be held in adjusted position by means of a set screw 7 or the like. A braiding die 8 is mounted on the upper end of the support 6, said die being removable for interchange with others having apertures of different shape or size, the upper end of the die defining the braiding point 9.

The inner periphery of the support 1 is provided with a carrier raceway, here illustrated by way of example as a groove 10 (Figs. 2, 4, 10, 11) formed in the inner peripheral surface of the support 1 and consisting of a plurality of intersecting circles whose centers are all preferably in substantially the same plane with the braiding point 9.

Figure 5:
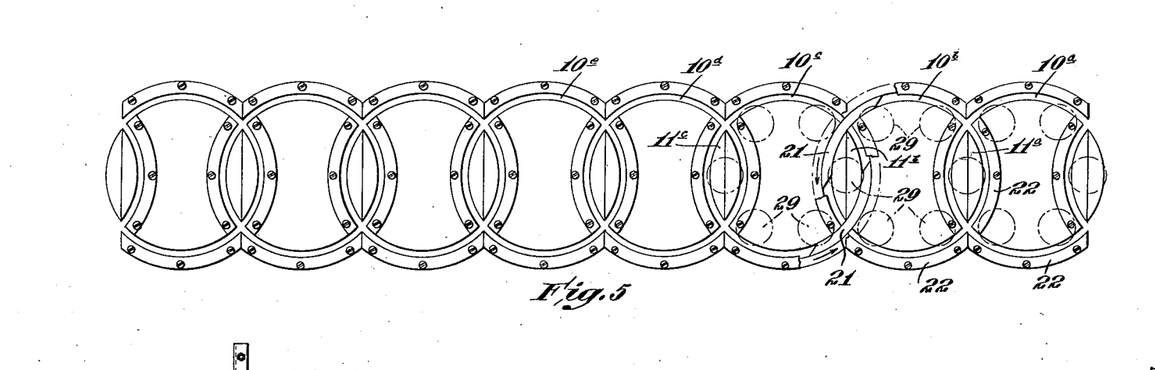
Fig. 5 is a developed view of the carrier raceway.

Referring to Fig. 5, which is a developed view of the interior surface of the annular support 1, these circles, which collectively constitute the carrier raceway, are designated 10$^a$, 10$^b$, 10$^c$, 10$^d$, etc., the raceway comprised of these circles extending completely around the inner circumference of the support, and, as here shown, consisting of eight of these raceway circles. The centers of the circles comprising this raceway are symmetrically disposed about the inner periphery of the support and so spaced apart that adjacent circles overlap and intersect thereby to define a series of lenticular spaces or areas 11$^a$, 11$^b$, 11$^c$ (Fig. 5) bounded by portions of each adjacent pair of circles. It will be noted that the several circles are disposed in planes which define the faces of a geometrical prism whose base is a regular polygon and whose axis passes through the braiding point and is coincident with the vertical axis of the machine.

The machine also comprises a plurality of bobbin carriers or carriages 12 (Figs. 2, 4, 7), each comprising a base 13 (Figs. 7, 8, 9) which supports a frame 14 (Fig. 2) designed to carry a yarn mass 15. As illustrated, the yarn mass is carried by a rotary bobbin 16 carried by a spindle journaled in spaced parallel walls 14$^a$, 14$^b$ (Fig. 4) of the frame. These walls 14$^a$ and 14$^b$ also support a rod or bar 17 parallel to the axis of the bobbin and which supports one or more resilient tension devices 17$^a$, 17$^b$, etc., preferably of clock spring type having flat arms which bear against the periphery of the yarn mass 15 thereby to control the rate of delivery of the yarn Y. The frame 14 of the carriage also comprises a bridgepiece 18 having a guide eye 19 through which the yarn from the bobbin passes on its way to the braiding point 9.

Each carriage or carrier base 13 comprises a segmental internal gear 20, preferably of hard fiber to reduce noise and preferably of a standard commercial pitch. Each carrier base 13 is also furnished with a segmental shoe 21 which is disposed in one of the respective raceway circles 10$^a$, 10$^b$, etc., each of these circles being provided with one of said carrier shoes (note circles 10$^b$ and 10$^c$, Fig. 5). Each segmental shoe 21 is provided with a rabbet 22ª in its upper face designed to receive the inner edge of segmental retaining plates 22 (Fig. 2) which overlap the outer edge of the raceway groove in which the shoe is disposed. Several of these plates 22 (Fig. 5) are associated with each of the raceway circles so as to overlap the outer edge of the circle at all points except where one of the circles intersects another.

Drive shafts 23 (Fig. 2), each concentric with one of the raceway circles 10ª, 10ᵇ, etc., are journaled in suitable bearings in the annular support 1, said shafts extending substantially radially of the support and each being provided with a large drive gear 24 adjacent to its outer end. One of these shafts may be extended beyond its gear 24, as shown for example at 25, and, if necessary, supported in an outboard bearing 25ª (Fig. 1) to receive a pulley 26 to which power is supplied from any suitable source for driving the entire machine.

Each of the drive gears 24 meshes with a group of six carriage actuating pinions 27 (Figs. 1 and 2) having their axes disposed symmetrically about one of the raceway circles 10ª, 10ᵇ, 10ᶜ, etc. and converging toward the braiding point 9. Two of the pinions 27 of each group of six, for example the pinions 27ª and 27ᵇ (Fig. 1), have their axes disposed substantially in the plane of the axes of the raceway circles, each carrier actuating pinion 27ª, 27ᵇ, etc. whose axis is thus disposed being included in two adjacent groups of pinions. The axis of each of these pinions 27ª, and 27ᵇ, etc. is disposed at the center of symmetry of one of the lenticular spaces 11ª and 11ᵇ, etc. defined by the intersecting raceway circles as above described.

Each of the pinions 27 of each group is mounted upon the outer end of a shaft 28 (Fig. 2) journaled in suitable bearings in the annular support 1, and at its inner end each shaft 28 carries a pinion 29 which is designed to mesh with the segmental gears 20 of the bobbin carriages. As illustrated in Fig. 5, each of these segmental gears 20 is of such length as always to mesh with at least one of the pinions 29.

The driving connections above described, including the gears 24, pinions 27 and 29, and segmental gears 20, cause the carriers of adjacent raceway circles to revolve about the centers of said circles in opposite directions, respectively, as indicated for example in Fig. 5.

As the carriers revolve in their respective raceway circles, the guide eyes of the carriers revolve in circular paths each concentric with the axis of the respective raceway circle, such circular paths defining, in effect, the bases of geometrical right circular cones of which the braiding point constitutes the common apex, the axes of the cones being symmetrically disposed about said apex and in the same plane. Thus each guide eye is always located at substantially the same distance from the braiding point, regardless of the position of its carrier in the raceway. For this reason no substantial variation in tension is imposed upon the yarn as it passes from the bobbins to the braiding point, so that a substantially uniform product may be obtained without recourse to complicated, expensive and unreliable forms of tension.

The support 6 which carries the braiding die preferably is provided at its lower end with a bracket 30 (Fig. 1) which supports a yarn guide roll or rolls 31 disposed to receive the completed braid as it emerges from the lower end of the tubular support 6 and to guide it in the proper direction toward a take-up drum reel 32 (Fig. 1) mounted in bearings in a bracket 33 supported by the annular plate or spider 3 and which is driven slowly by means of a worm wheel 34 and a worm 35 on a power-driven shaft 36. This shaft is furnished with a pulley 36ª about which a belt (not shown) passes,—such belt embracing a pulley, for example a pulley 36ᵇ, at the outer end of one of the shafts 28.

Figures 16, 19, 20, 21:
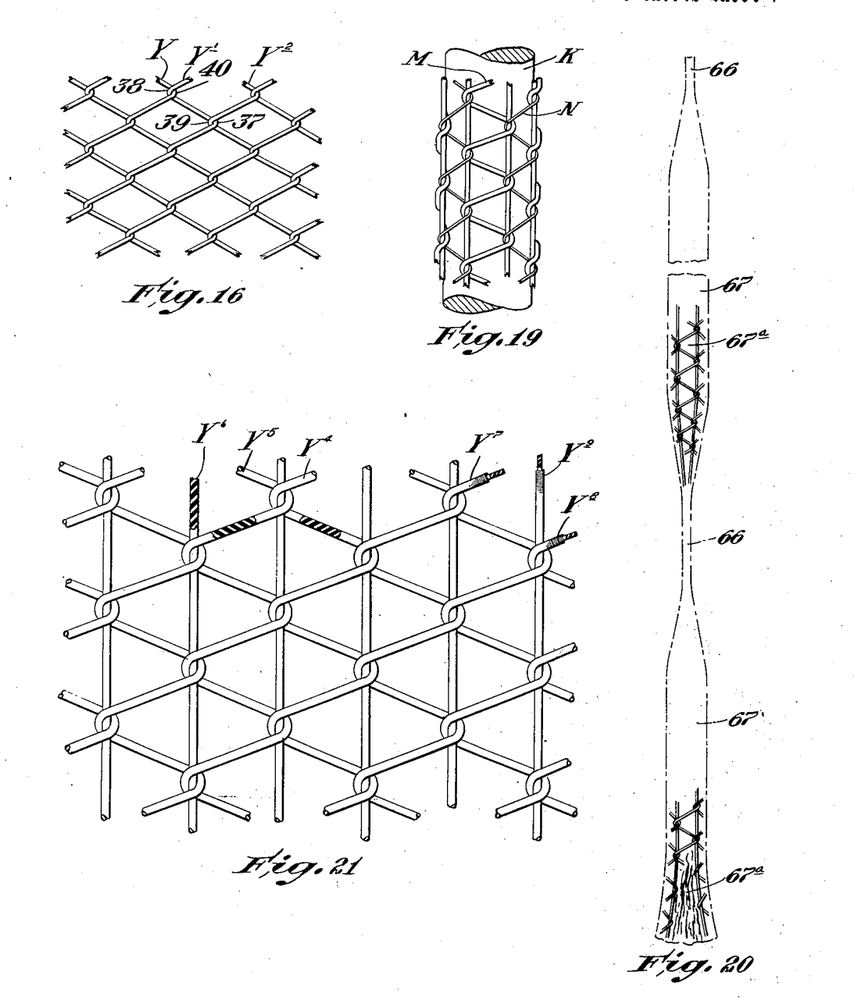
Fig. 16 is a fragmentary developed view of a braid of the type produced by the improved machine.
Fig. 19 is a fragmentary side elevation illustrating tubular braided fabric having a core, made in accordance with the present invention, and showing a longitudinally striped effect.
Fig. 20 is a fragmentary elevation illustrating tubular braided fabric including discontinuous lengths of core material.
Fig. 21 is a fragmentary elevation of elastic braided fabric capable of being made upon a machine of the type herein disclosed.

Assuming that the several carriages or carriers have been supplied with bobbins and that the yarn from each bobbin has been passed through the corresponding guide eye 19 and thence down through the braiding die, and connected to the take-up drum 32, the application of power to the machine causes each of the carriages to move in a circular path about a fixed center, the paths of adjacent carriages intersecting so that the yarn from each carriage first passes around the yarn from the carriage on its right-hand side and then about the yarn from the carriage on the left-hand side, the resultant tubular fabric which forms at the braiding point and which passes down through the hollow support 6 and thence to the take-up drum being of substantially the character illustrated in Fig. 16. Thus, as shown in this latter figure, the yarns Y, Y¹ and Y² each follows a zigzag course longitudinally of the fabric, the yarn Y¹ comprising bights 37 directed toward the right and alternating bights 38 directed toward the left. The bights 37 embrace the bights 39 of the yarn Y², while the bights 38 embrace bights 40 of the yarn Y. In the fabric as thus produced, if one of the body yarns, for example the yarn Y¹, be cut or broken, the adjacent yarns Y and Y² are released so that if the fabric is originally tubular it opens out to form a substantially flat fabric, a characteristic which is of value when it is desired to release material, for example a core, from within the tubular braided structure.

While in Fig. 16 the fabric is shown on a large scale and of very open mesh for convenience in illustration, it is to be understood that the fabric may be made of a finer and closer mesh, if desired, dependent upon the tension imposed upon the constituent yarns, the size and the shape of the braiding die, and the number of carriages employed.

While the simple mesh fabric illustrated in Fig. 16, and which consists only of yarns supplied from the bobbins of the carriages, is desirable for certain purposes, it is preferable for certain other purposes to introduce warp yarns into the fabric. Such warp yarns normally extend substantially straight from end to end of the fabric and, if of inelastic, inextensible material, substantially prevent longitudinal stretch of the completed braid. On the other hand, if these longitudinal warp yarns be of elastic material and introduced into the fabric under tension, they tend to contract the fabric as it is released from tension, resulting in a material capable of elastic elongation which is desirable for some purposes.

Figure 16A:
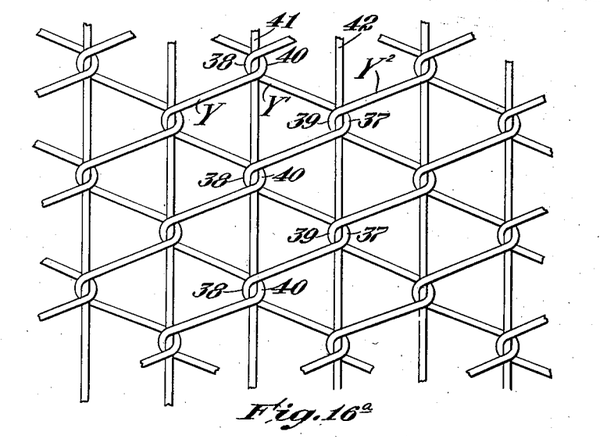

In introducing these warp yarns, it is preferable to associate them with the body yarns from the carrier bobbins in such a way that the warp yarns are caught between the interlocked bights of adjacent body yarns. Such a fabric having longitudinal warp yarns is indicated in Fig. 16ª, the body yarns Y, Y¹ and Y², etc. being disposed substantially as illustrated in Fig. 16 but with the longitudinal, substantially straight warp yarns 41, 42, etc. caught between the embracing bights 38, 40 and 37, 39, respectively, of adjacent pairs of body yarns. Since these warp yarns lie substantially straight in the completed fabric and form no essential part of the fabric structure, they could, if desired, be pulled out from the completed fabric without destroying the continuity of the latter.

For preparing fabric such as illustrated in Fig. 16a, provision must be made for delivering the warp strands into the forming braid. To this end certain of the shafts 28 which carry the pinions 27 and 29 are made hollow or tubular, for example, the shafts 28x, 28y which carry pinions 27a, 27b, etc., thus providing passages through which warp yarns may enter into the geometrically lenticular, conical spaces defined by the body yarns from adjacent carriers as such yarns pass from the guide eyes of their carriers and the braiding point, during that part of the travel of the carriers at which they occupy the intersecting portions of adjacent raceways.

Figure 18:
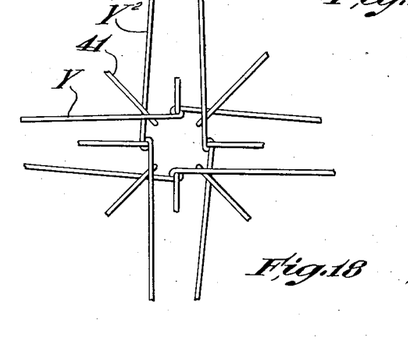
Fig. 18 is a diagrammatic plan view illustrating the manner in which the body yarns and the warp yarns approach the braiding point.

Suitable yarn packages, for example spools or bobbins for the warp yarns, may be mounted in supports or holders provided by brackets 43 mounted upon a radial flange 44 (Figs. 1 and 4) projecting from the upper part of the support 1. These supports or holders may be of any approved type, for example, such as those illustrated in the patent to Petersen No. 1,526,087, dated February 10, 1925, each having provision for holding a rotating yarn mass (not shown) and for applying appropriate tension to the yarn. Suitable guide arms 45 (Fig. 1) depending from the flange 44 have guide eyes 46 disposed adjacent to and in line with the passages through the respective hollow shafts 28x, 28y, etc., thereby properly to direct the warp yarn from a given package into the passage through the hollow shaft on its way to the braiding point at which the warp and body yarns are concatenated as illustrated in Fig. 18.

For certain purposes it is desirable to employ warp yarns each consisting of a plurality of strands, as, for instance, when a bulky warp yarn is desired or where it is essential to use a very large number of associated strands, for example, of different materials or colors. It may be desired that such warp yarns shall have a predetermined twist, more or less, and in one or the other direction thereby to avoid imparting unbalanced twist to the completed braid or to neutralize the tendency of the braid to twist by reason of the character of the body yarns employed. Again it may be desired to associate strands which are of very fragile material, or which are very slippery and difficult to handle, if associated without substantial twist in large numbers to make a bulky soft strand of large diameter.

For the purpose of delivering warp yarns having the above characteristics, it is proposed to provide the machine with means for associating a large number of individual strands so as to make up a warp yarn of the requisite type and with provision for delivering such composite yarn without substantial danger of breakage, kinking or abrasion directly to the passage in one of the hollow warp guiding shafts. Thus, referring to Fig. 10, which illustrates enough of the machine to include one of the hollow shafts 28x, the flange 44 of support 1 carries a bracket 47 having a boss at its outer end provided with a journal opening for the hollow spindle 48 provided at its lower end with a flared yarn guide 47 disposed substantially on the axis of the corresponding shaft 28x. This spindle 48 supports an annular bobbin carrier or cage 50 designed to carry a series of yarn packages, for example, rotary vertical spools 51, each, if desired, being provided with a brake or tension (not shown). From these spools the individual yarns converge toward and enter the upper end of the hollow spindle 48. If it be desired that the warp yarn comprise a core element, a suitable frame 52 may be mounted at the top of the cage 50, such frame supporting a yarn mass carried, for example, by a rotary horizontal spool 53 provided with yarn tensioning means, if desired, and from which the yarn extends down into the upper end of the hollow spindle 48.

Figure 10:
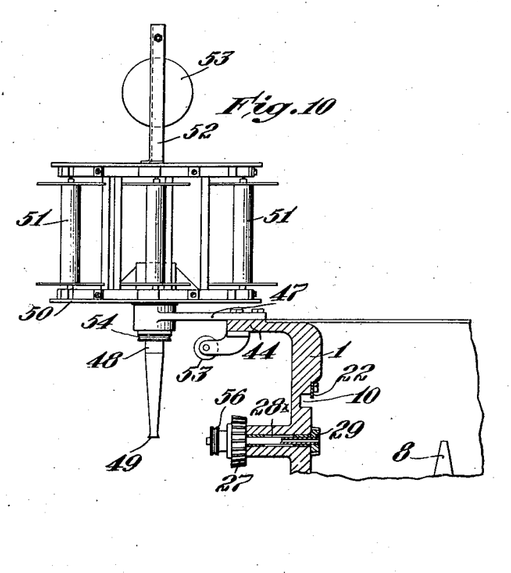
Fig. 10 is a fragmentary vertical section on the line 10—10 of Fig. 2, showing a modified arrangement including means for twisting and delivering a warp yarn.

The spindle 48 is furnished with a pulley 54 which is embraced by a belt (not shown) passing about guide pulleys 55 and about a driving pulley 56 mounted on the outer end of the shaft 28x so as to turn with the latter. By properly proportioning the pulleys 54 and 56 the speed of rotation of spindle 48 may be determined and thus the degree of twist imparted to the strands comprising the warp yarn may be varied. Obviously, if desired, an opposite twist may be imparted to the warp yarns delivered to adjacent shafts 28x, 28y, etc., so as to ensure proper balancing of the completed braid. Since the warp yarn, after leaving the lower end of the spindle 48, is obliged to move but a short distance unsupported on its way to the entrance to the tubular shaft 28x, there is little danger of breakage, kinking, or other damage, even though the warp yarn has but slight twist and consists of a great number of individually fragile, slippery or kinky strands.

For the manufacture of certain kinds of material it is desirable to deliver a core, either continuous or discontinuous, into the center of the tubular braid as the latter is formed. For the production and delivery of a continuous core, particularly when a bulky multi-strand core is desired, the machine may be provided with core-forming mechanism generally similar to the mechanism for forming a composite warp yarn, as just above described. Thus, for example, a bracket 57 (Fig. 1) may be arranged to project upwardly from the flange 44 so as to overhang the center of the machine, said bracket having a terminal boss 58 provided with a vertical journal opening for a tubular spindle 59 provided adjacent to its lower end with a grooved pulley 60. An endless belt (not shown) embraces this pulley and, after passing about a guide pulley or pulleys 60a on the bracket 57, the belt embraces a driving pulley 61 on an extension 28a of one of the rotary shafts 28.

Figure 1:
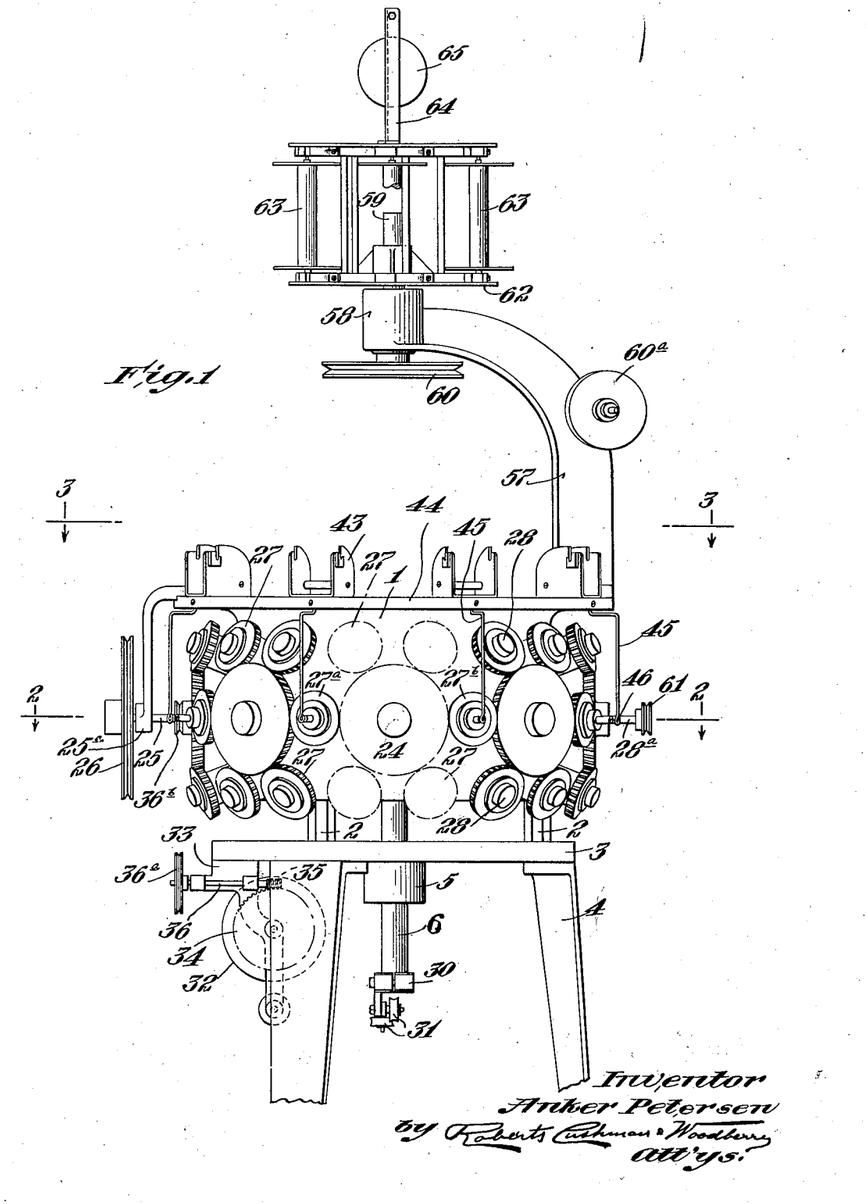
Fig. 1 is a fragmentary side elevation of the machine, with certain parts omitted.
Figure 2:
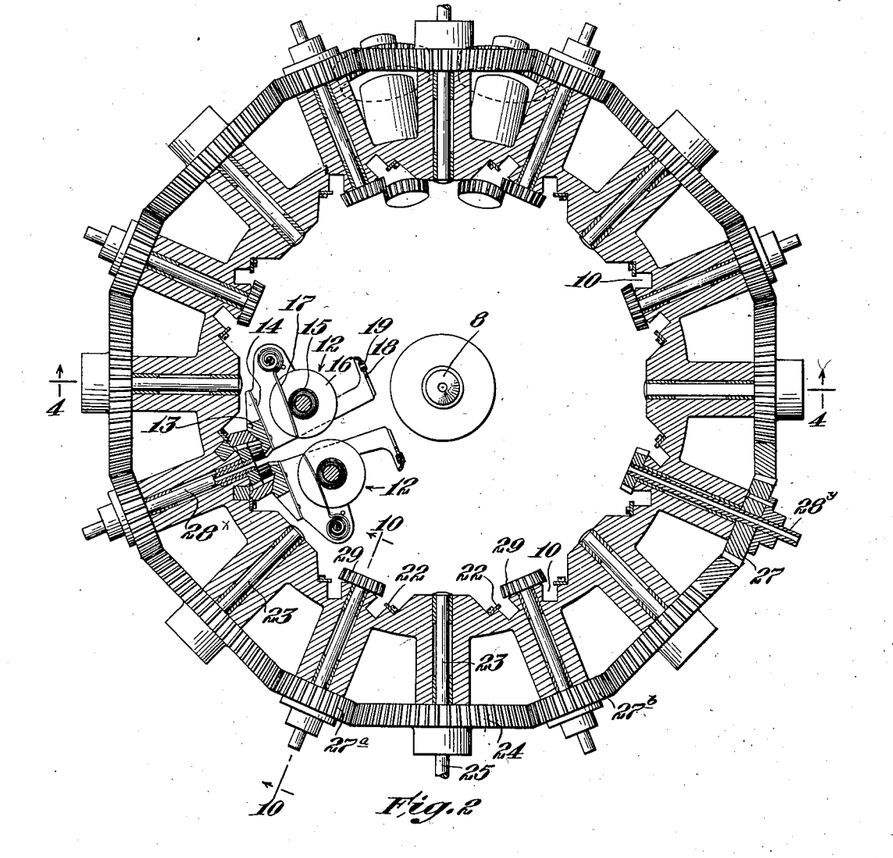
Fig. 2 is a horizontal section, substantially on the line 2—2 of Fig. 1, omitting certain parts.
Figure 3:
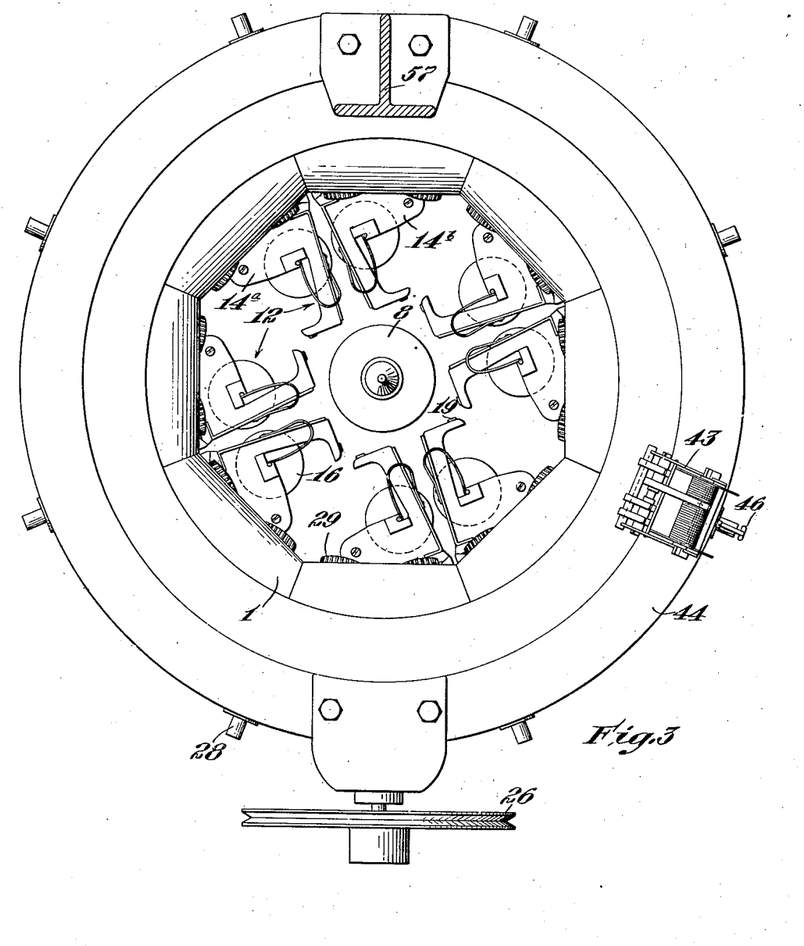
Fig. 3 is a horizontal section on the line 3—3 of Fig. 1.

The vertical spindle 59 carries an annular support or cage 62 having provision for supporting a plurality of yarn masses, carried for instance, upon rotary spools 63, each provided with yarn tensioning means (not shown) of appropriate type, and designed to deliver their yarns in converging relation to the upper end of the hollow spindle 59. If it be desired to make a multiple strand core which itself includes a core about which the other strands are grouped or wrapped, the cage 62 may be provided with a frame 64 supporting a horizontal spool 65 carrying a core strand or core material the latter being drawn off from the spool and extending down into the entrance to the hollow shaft 59. As the cage 62 is rotated, the strands from spools 63 are twisted about each other or wrapped about the core strand, if the latter be used, and as the lower end of the shaft 59 is preferably located directly above the braiding point 9, the composite core material moves vertically down into the braiding die so as to be covered by the forming braid. Any desired twist may be imparted to the core material by properly proportioning the pulleys 60 and 61.

For certain purposes it may be desired to form a braid having a discontinuous core so that the braid assumes an external appearance of the general form illustrated in Fig. 20, wherein the portions 66 are of small diameter, containing no core or only a small core, while the parts 67 are of greater diameter and contain sections of core of definite and usually uniform length. Such a braid may be considered as an elongate container or series of packages, bags, or jackets, the lengths of core material 67ª forming the contents of the respective packages, bags, or jackets and being readily released from the jacket material by cutting or breaking one of the body yarns of such jacket material as illustrated at the lower part of Fig. 20.

In order to form such a braided structure containing discontinuous core material, the machine may be provided with a supporting bracket 68 (Fig. 11) mounted on the flange 44 of the support 1 and carrying an annulus 69 disposed coaxially with and above the braiding die 8, said annulus being of an internal diameter sufficient to accommodate the core material which has to be fed into the forming braid.

Figure 12:
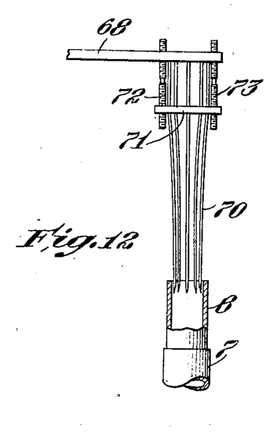
Fig. 12 is a side elevation of the core guiding cage shown in Fig. 11, with the braiding die in fragmentary section.
Figure 13:
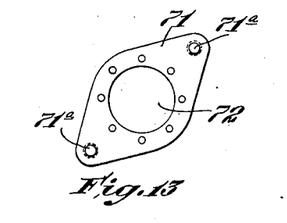
Fig. 13 is a plan view, to large scale, showing an adjusting device for varying the effective diameter of the core guiding cage.
Figure 14:
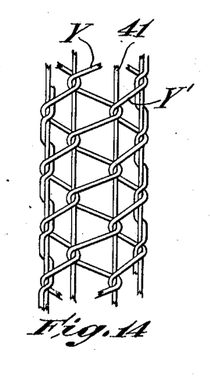
Fig. 14 is a fragmentary side elevation illustrating a tubular fabric such as is produced by the present machine.

From this annulus spring fingers 70 extend downwardly in the form of an open cage, the free, lower ends of these fingers being disposed just within the upper end of the braiding die, the fingers preferably converging downwardly. Preferably, provision is made for constricting the lower end of this cage more or less, for example, by arranging the fingers 70 to extend down through holes in a gauge plate 71 (Figs. 11, 12, 13) having a central opening 72 for the passage of the core material and having internally screw threaded openings 71ª for the reception of adjusting screws 72 and 73 by means of which the gauge plate may be moved up and down, thus moving the lower ends of the fingers 70 toward and from each other, thereby to accommodate the cage to braiding dies of different diameters.

Figures 11, 15:
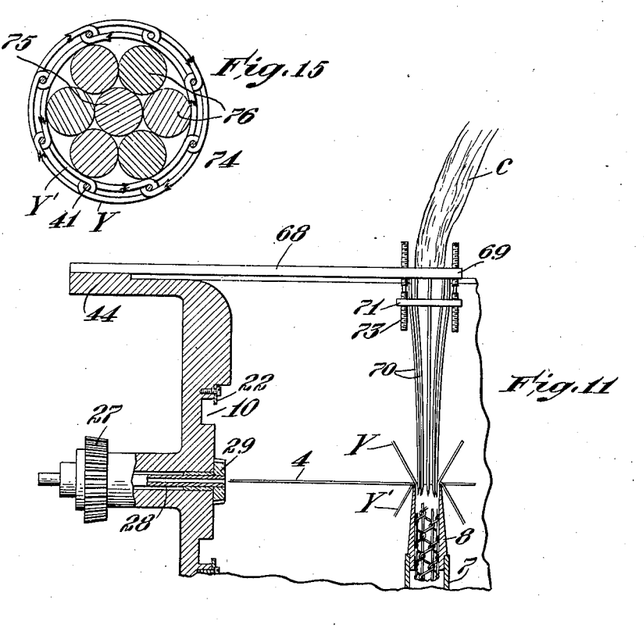
Fig. 11 is a fragmentary diagrammatic vertical section, with parts omitted, illustrating means for delivering a core to be braided about at the braiding point.
Fig. 15 is a transverse section, to very large scale, showing a tubular braided fabric including a multi-strand core.

In the use of this core feeding apparatus, a length of core material C may be delivered into the upper end of the guide cage either by hand or by appropriate automatic feeding mechanism (not shown), said core material being confined by the cage and guided down into the braiding die where it is jacketed by the forming braid and is pulled downwardly by the latter as the braid is drawn off by the take-up. The intervals between successive sections of core material may be determined by the operator, if hand feeding be employed, or in accordance with the design and setting of the automatic feeding means, if the latter be used. At the points between consecutive lengths of core material, the body and warp yarns tend to draw together, thus making a section 66 of very small diameter as compared to the diameter of that part 67 of the braid which contains the core material. After completion of the braid, it may be divided at these narrow sections, as by cutting it through transversely, thus forming a series of elongate packages each consisting of a length of core material jacketed by the intertwined or concatenated body yarns.

In Fig. 15 there is illustrated, in transverse section and to large scale, a tubular braid in accordance with the present invention and in which a multiple strand core is employed, such core comprising the inner secondary core 75 and the associated outer strands 76. These strands 75 and 76, for example, may be of some very light and loose material, for example the material known as "cellulose wadding", cotton linters, or lint cotton, wool or, in fact, any other desired fibrous, absorbent, or other material suitable for the particular use desired.

Figure 6:
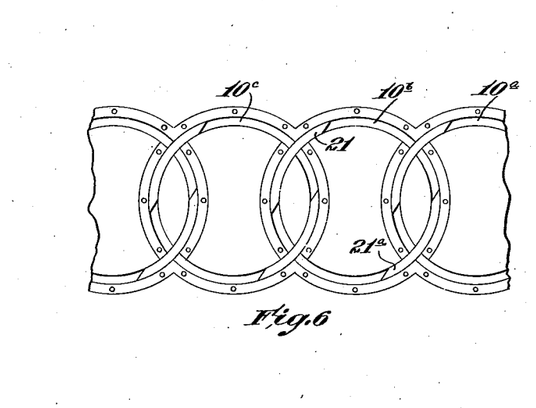
Fig. 6 is a fragmentary diagrammatic developed view of the carrier raceway indicating the relative positions of four adjacent braiding carriers at a given instant in the operation.
Figure 17:
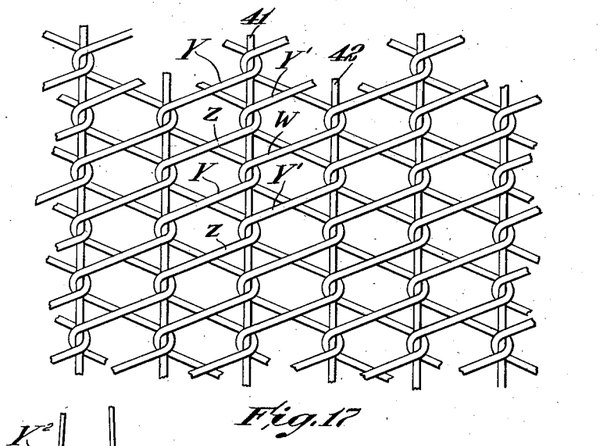
Fig. 17 is a view similar to Fig. 16$^a$, but illustrating so-called "double" fabric produced by a machine having a greater number of braiding carriers but the same number of warp guides.

In the arrangement illustrated in Fig. 5, each raceway circle is provided with but one braiding carriage and the resultant fabric is shown in Fig. 16. However, a finer mesh material, such as shown in Fig. 17, may be made upon the same machine merely by doubling the number of carriers,—the carriers then being arranged as indicated in Fig. 6, for example, where each raceway circle 10ª, 10ᵇ, 10ᶜ, etc., is occupied by the shoes 21 and 21ª of two carriages, respectively, the shoes being always disposed at diametrically opposite parts of the circle. Thus, although the same number of warp yarns 41, 42, etc. may be used, there are twice as many body yarns Y, Z; Y¹, W, etc. with a resultant finer and closer fabric.

Further diversity in effect may be obtained as illustrated, for example, in Fig. 19, by selecting body yarns which are of different size and material. Thus the body yarns M may be of a heavy material while the alternate yarns N are of a lighter or thinner material, the result being the formation of a longitudinally ribbed effect. By using alternate body yarns of different colors, pronounced longitudinal stripes may be obtained, and if the core K employed be of a color similar to that of one of the body yarns, the correspondingly colored body yarn becomes substantially invisible, the effect being that of distinct stripes of the core color with intervening zigzag ladders of the contrasting color.

Among other capabilities of the machine, it is contemplated that it may be employed for the production of elastic fabrics in which either the body yarns, the warp yarns, the core yarns, or all of them, may be of elastic material. Thus, as illustrated in Fig. 21, the body yarns Y⁴ and Y⁵ and the warp yarns Y⁶ are rubber strands, for example cut rubber threads, while at another point of the fabric the body yarns Y⁷ and Y⁸ and the warp yarns Y⁹ are rubber threads covered with textile or other wrappings.

It is further evident that by increase in the size of the braiding die it becomes possible to make fabric of large diameter sufficient to form bags, sacks or jackets for merchandise of various kinds, or to form insulating coverings for electrical wires or cables, it being within the scope of the operation of the machine to use wires or the like either as the body yarns, warp yarns or core yarns.

It has already been noted that by the described arrangement of the yarn carriers and the guide eyes with reference to their paths of movement and the braiding point, substantially no difficulty is experienced in maintaining a proper and even tension on the yarn by the use of simple tensioning means. Moreover, since the yarn carriers always move in circular paths, it is possible to drive the machine at very high speeds as compared with machines of the "Maypole" type, and greatly to increase the rate of production. It thus becomes possible to use this machine for the manufacture of strands of small diameter having the characteristics of braided material but at a cost enabling them to compete with ordinary twisted strands for use as sewing threads or the like. Not only can the machine be driven at high speed, but since the parts move in circular paths without abrupt change in direction, the machine is very quiet, and wear on the operating parts is reduced to a minimum, while the employment of gears, pinions, etc. of standard commercial dimensions as the actuating means for the carriers greatly reduces the cost of building the machine and its upkeep.

While certain desirable embodiments of the invention have herein been illustrated and described by way of example, it is to be understood that the invention is not necessarily limited to the precise details described nor to the materials suggested, but that any equivalents, either in mechanism or materials or the relative arrangement of parts, are to be regarded as falling within the scope of the invention.

I claim:

1. A braiding machine having two sets of yarn carriers, the carriers of one set alternating with those of the other set, means for revolving the carriers of one set each in an individual orbit oppositely to the carriers of the other set, the orbits of adjacent carriers intersecting, the axes of the several orbits being disposed in substantially the same plane and intersecting at a common point, the several orbits lying respectively in planes forming the faces of a regular prism whose axis passes through the aforesaid point of intersection and a braiding die located substantially at said point of intersection.

2. A braiding machine having two sets of yarn carriers, the carriers of one set alternating with those of the other set, means for revolving the carriers of one set each in an individual orbit oppositely to the carriers of the other set, the orbits of adjacent carriers intersecting, the axes of the several orbits being disposed in substantially the same plane and intersecting at a common point, means defining a braiding point at said intersection, the several orbits lying respectively in planes forming the faces of a regular prism whose axis passes through the aforesaid point of intersection and a fixed guide eye for a warp yarn within one at least of said orbits.

3. A braiding machine having two sets of yarn carriers, the carriers of one set alternating with those of the other set, means for revolving the carriers of one set each in an individual orbit oppositely to the carriers of the other set, the orbits of adjacent carriers intersecting, the axes of the several orbits being disposed in substantially the same plane and intersecting at a common point, means defining a braiding point at said intersection, the several orbits lying respectively in planes forming the faces of a regular prism whose axis passes through the aforesaid point of intersection and a fixed guide eye for a warp yarn disposed within the lenticular space defined by a pair of intersecting orbits.

4. A braiding machine having two sets of yarn carriers, the carriers of one set alternating with those of the other set, means for revolving the carriers of one set each in an individual orbit oppositely to the carriers of the other set, the orbits of adjacent carriers intersecting, the axes of the several orbits being disposed in substantially the same plane and intersecting at a common point, means defining a braiding point at said intersection, the several orbits lying respectively in planes forming the faces of a regular prism whose axes pass through the aforesaid point of intersection, a fixed guide eye for a warp yarn disposed substantially at the center of symmetry of one of the lenticular spaces defined by a pair of intersecting orbits, and means for delivering a twisted multi-ply warp yarn to said guide eye.

5. A braiding machine having two sets of yarn carriers, the carriers of one set alternating with those of the other set, means for revolving the carriers of one set each in an individual orbit oppositely to the carriers of the other set, the orbits of adjacent carriers intersecting, the axes of the several orbits being disposed in substantially the same plane and intersecting at a common point, a braiding die substantially at said intersection, the several orbits lying respectively in planes which form the faces of a regular geometrical prism whose axis passes through said common point of intersection, a guide opening within the lenticular space defined by the intersection of a pair of adjacent orbits, a rotary bobbin support, a plurality of bobbins in said support, means for rotating the bobbin support thereby to twist strands from the several bobbins to form a warp yarn, and means for guiding such warp yarn as formed directly to the guide opening.

6. A braiding machine having two sets of yarn carriers, the carriers of one set alternating with those of the other set, means for revolving the carriers of each set each in an individual orbit oppositely to the carriers of the other set, the orbits of adjacent carriers intersecting, the axes of the several orbits being disposed in substantially the same plane and intersecting at a common point, a braiding die substantially at said intersection, said orbits lying respectively in planes forming the faces of a regular geometrical prism whose axis passes through said point of intersection, a guide opening within the lenticular space defined by the intersection of a pair of adjacent orbits, and means for forming and delivering a cored multi-ply warp strand to said guide opening.

7. A braiding machine of the class described comprising a series of braiding carriers each including a support for a yarn mass and a yarn delivery eye, means defining a braiding point, guiding means for the several carriers so constructed and arranged that the guide eyes of adjacent carriers always move in intersecting circular paths which lie respectively in planes forming the faces of a regular prism whose axis passes through the braiding point, each such circular path constituting an element of a geometrical, right circular conical surface whose apex is substantially at the braiding point, the axes of the several cones being in substantially the same plane, and means for revolving alternate carriers simultaneously in opposite directions thereby to interloop the yarns from adjacent carriers.

8. A braiding machine of the class described comprising a series of braiding carriers each including a support for a yarn mass and a yarn delivery eye, means defining a braiding point, guiding means for the several carriers so constructed and arranged that the guide eyes of adjacent carriers always move in intersecting circular paths which lie respectively in planes forming the faces of a regular prism whose axis passes through the braiding point, each such circular path constituting an element of a geometrical, right circular conical surface whose apex is substantially at the braiding point, the axes of the several cones being in substantially the same plane, means for revolving alternate carriers simultaneously in opposite directions thereby to interloop the yarns from adjacent carriers, and means for directing a warp yarn to pass to the braiding point along the axis of one at least of the lenticular conical spaces defined between said intersecting conical surfaces.

9. A braiding machine of the class described comprising a series of braiding carriers each including a support for a yarn mass and a yarn delivery eye, means defining a braiding point, guiding means for the several carriers so constructed and arranged that the guide eyes of adjacent carriers always move in intersecting circular paths each defining the base of a geometrical, right circular conical surface whose apex is substantially at the braiding point, the axes of the several cones being in substantially the same plane, said paths being respectively in planes forming the faces of a regular prism whose axis passes through the braiding point, means for revolving alternate carriers simultaneously in opposite directions thereby to interloop the yarns from adjacent carriers, a substantially fixed guide eye located within the lenticular space defined by one pair of said intersecting circular paths, and means for delivering a warp yarn so as to pass through such stationary eye and to the braiding point.

10. A braiding machine of the class described comprising a series of braiding carriers each including a support for a yarn mass and a yarn delivery eye, means defining a braiding point, guiding means for the several carriers so constructed and arranged that the guide eyes of adjacent carriers always move in intersecting circular paths each constituting an element of a geometrical, right circular conical surface whose apex is substantially at the braiding point, the axes of the several cones being in substantially the same plane, said paths being respectively in planes forming the faces of a regular prism whose axis passes through the braiding point, means for revolving alternate carriers simultaneously in opposite directions thereby to interloop the yarns from adjacent carriers, a substantially fixed guide eye located within each of the lenticular spaces defined by the respective pairs of intersecting circular paths, means for twisting a plurality of individual threads to form a warp yarn, and means for directing such a warp yarn to each of the aforesaid fixed guide eyes.

11. A braiding machine comprising six or more braiding carriers each moving in a circular orbit whose plane intersects the plane of the orbit of an adjacent carrier, each carrier including means for supporting a yarn mass and each having a yarn delivery guide, means defining a braiding point, means for supporting and guiding the braiding carriers, and means for imparting a relative movement to the carriers, such supporting, guiding and motion-imparting means being so constructed and arranged that the delivery guide eyes of all of the carriers are always at substantially the same distance from the braiding point.

12. A braiding machine comprising an annular support having a carrier raceway in its inner periphery, said raceway comprising at least four intersecting circles, a plurality of carriers, each comprising a guide shoe, arranged to move in each of the raceway circles, respectively, means for revolving the carriers of adjacent raceway circles in opposite directions, and means providing a braiding point in a plane defined by the axes of the several circles.

13. A braiding machine comprising an annular support having a carrier raceway in its inner periphery, carriers in said raceway, means for driving the carriers, and means defining a braiding point substantially in the center of said annular support and in a plane substantially midway between the upper and lower limits of said raceway.

14. A braiding machine comprising a support providing a chamber having a peripheral wall in which is a raceway channel comprising a series of intersecting circles whose axes lie in substantially the same plane, carriers, each having a guide element which moves in one of said circles, respectively, a group of drive shafts corresponding to each of said circles, the shafts of each group being symmetrically disposed about the axis of the corresponding circle, and all of the shafts of all of the groups having their axes directed to intersect at the braiding point.

15. A braiding machine comprising a support providing a chamber having a peripheral wall in which is a raceway channel comprising a series of intersecting circles whose axes lie in substantially the same plane, carriers, each having a guide element which moves in one of said circles, respectively, and a group of drive shafts corresponding to each of said circles, the shafts of each group being symmetrically disposed about the axis of the corresponding circle, two shafts of each group being common to adjacent groups.

16. A braiding machine comprising a support providing a chamber having a peripheral wall in which is a raceway channel comprising a series of intersecting circles whose axes lie in substantially the same plane, carriers, each having a guide element which moves in one of said circles, respectively, a group of drive shafts corresponding to each of said circles, the shafts of each group being symmetrically disposed about the axis of the corresponding circle, two shafts of each group being located in the lenticular spaces defined by the intersections of adjacent circles.

17. A braiding machine comprising a support providing a chamber having a peripheral wall in which is a raceway channel comprising a series of intersecting circles whose axes lie in substantially the same plane, carriers, each having a guide element which moves in one of said circles, respectively, a group of drive shafts corresponding to each of said circles, the shafts of each group being symmetrically disposed about the axis of the corresponding circle, a drive gear concentric with each circle, and a gear on each shaft of a group meshing with the corresponding drive gear.

18. A braiding machine comprising a support providing a chamber having a peripheral wall in which is a raceway channel comprising a series of intersecting circles whose axes lie in substantially the same plane, carriers, each having a guide element which moves in one of said circles, respectively, a group of drive shafts corresponding to each of said circles, the shafts of each group being symmetrically disposed about the axis of the corresponding circle, and means defining a braiding point in the plane of the axes of the several circles, the axes of all of the drive shafts of the several groups converging toward the braiding point.

19. A braiding machine comprising an annular support having a substantially cylindrical inner peripheral surface, a raceway channel in said cylindrical surface, said channel comprising a series of intersecting circles, carriers arranged to move in each of the circles, respectively, means for moving the carriers each in a circular path, and means providing a braiding point disposed substantially at the axis of said cylindrical surface.

20. A braiding machine comprising an annular support having a substantially cylindrical inner peripheral surface, a raceway channel in said cylindrical surface, said channel comprising a series of intersecting circles whose axes are in the same plane, carriers arranged to move in each of the circles, respectively, means for moving the carriers each in a circular path, and means providing a braiding point disposed substantially at the axis of said cylindrical surface and in the plane defined by the axes of the raceway circles.

21. A braiding machine comprising an annular support having an inner peripheral surface provided with a raceway channel, means defining a braiding point substantially midway between the upper and lower limits of said channel, carriers movable along said channel and means for driving the carriers, said driving means comprising a plurality of drive shafts disposed symmetrically about the center of the annulus and with the axes of the several shafts passing through the braiding point.

22. In combination in a braiding machine of the type in which each of a plurality of individual braiding carriers revolves in a circular path intersecting that of an adjacent carrier, means providing a braiding point, a plurality of braiding carriers each having a yarn delivery guide element, and means defining said circular paths for the braiding carriers, said paths lying respectively in planes forming the faces of a regular prism whose axis passes through the braiding point whereby the yarn delivery element of any selected carrier is always substantially at the same distance from the braiding point.

23. In combination in a braiding machine of the type in which each of a plurality of individual braiding carriers revolves in a circular path intersecting that of an adjacent carrier, means providing a braiding point, a plurality of braiding carriers each having a yarn delivery guide element, and means defining said circular intersecting paths, said paths lying respectively in planes forming the faces of a regular prism whose axis passes through the braiding point, the centers of the several circular paths being disposed in a plane in which the braiding point is located, said circular paths intersecting said plane.

24. In combination in a braiding machine of the type in which each of a plurality of individual braiding carriers revolves in a circular path intersecting that of an adjacent carrier, means providing a braiding point, a plurality of pairs of braiding carriers, each individual carrier having a yarn delivery guide element, and means defining said circular intersecting paths for the respective pairs of braiding carriers, said paths lying respectively in planes forming the faces of a regular prism whose axis passes through the braiding point and having their centers in the same plane whereby, as a carrier describes its respective path, the yarn delivered by the carrier substantially describes a geometrical right conical surface with its apex at the braiding point and which intersects the corresponding conical surfaces defined by the yarns from the two adjacent carriers.

ANKER PETERSEN.